United States Patent
Pascazio et al.

(10) Patent No.: US 8,660,038 B1
(45) Date of Patent: Feb. 25, 2014

(54) PREVIEWING VOICEMAILS USING MOBILE DEVICES

(75) Inventors: Robert R. Pascazio, New York, NY (US); Raju Viswambharan, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1370 days.

(21) Appl. No.: 11/589,666

(22) Filed: Oct. 30, 2006

(51) Int. Cl.
*H04L 12/16* (2006.01)

(52) U.S. Cl.
USPC ............. 370/259; 370/310; 379/68; 379/88.1

(58) Field of Classification Search
None
See application file for complete search history.

(56) References Cited

U.S. PATENT DOCUMENTS

| | | | |
|---|---|---|---|
| 4,304,968 A | 12/1981 | Klausner et al. | |
| 4,406,001 A * | 9/1983 | Klasco et al. | 369/88 |
| 5,283,818 A | 2/1994 | Klausner et al. | |
| 5,390,236 A | 2/1995 | Klausner et al. | |
| 5,524,140 A | 6/1996 | Klausner et al. | |
| 5,572,576 A | 11/1996 | Klausner et al. | |
| 5,825,853 A * | 10/1998 | Kojima et al. | 379/88.1 |
| 6,282,430 B1 * | 8/2001 | Young | 455/522 |
| 6,408,177 B1 * | 6/2002 | Parikh et al. | 455/414.4 |
| 6,934,911 B2 * | 8/2005 | Salmimaa et al. | 715/744 |
| 7,397,805 B2 * | 7/2008 | Gao et al. | 370/395.41 |
| 7,609,820 B2 * | 10/2009 | Bedingfield, Sr. | 379/88.12 |
| 7,813,732 B2 * | 10/2010 | Grilli et al. | 455/435.1 |
| 2001/0019951 A1 * | 9/2001 | Haumont et al. | 455/413 |
| 2004/0121761 A1 * | 6/2004 | Tripathy et al. | 455/413 |
| 2005/0037739 A1 * | 2/2005 | Zhong | 455/413 |
| 2006/0013366 A1 * | 1/2006 | Gilbert | 379/67.1 |
| 2006/0182232 A1 * | 8/2006 | Kerr et al. | 379/67.1 |
| 2007/0129059 A1 * | 6/2007 | Nadarajah et al. | 455/413 |
| 2008/0098078 A1 * | 4/2008 | Daniell | 709/206 |
| 2008/0207176 A1 * | 8/2008 | Brackbill et al. | 455/413 |

OTHER PUBLICATIONS

"Visual Voicemail," Traverse Networks.

* cited by examiner

*Primary Examiner* — Brian Roberts
(74) *Attorney, Agent, or Firm* — Van Pelt, Yi & James LLP

(57) ABSTRACT

Previewing voice over internet protocol (VoIP) voicemail is disclosed. A request is sent for VoIP voicemail available to preview using a data channel associated with a cellular phone system. Information of voicemail available to preview and one preview portion for each of the voicemail available to preview are received. Information of voicemail available to preview is displayed. A selection of one of the available voicemails is received. A preview portion of the voicemail corresponding to the selection of one of the available voicemails is played.

25 Claims, 7 Drawing Sheets

PREVIEWING VOICEMAILS USING MOBILE DEVICES

BACKGROUND OF THE INVENTION

When a user does not answer a phone call, the caller is often able to leave a voicemail message. When a user has the opportunity, the user can check his/her voicemail messages by connecting with a phone system. The phone system allows the user to listen to stored voicemail messages, delete voicemail messages, and forward voicemail to another user. Navigation of the voicemail system of the phone system typically uses either directed keypad entries or voice commands through an interactive voice response (IVR) system. However, the time to navigate and/or access the voicemail system and messages in the system becomes longer as the number of messages increases (e.g., all messages must be listened to in sequence) and/or as the lengths of the messages increase. Limiting the number of voicemail messages or requiring the user to frequently clear out voicemails are solutions which move away from a usage of the voicemail system in the ways that email has evolved. While personal computers have high speed data links in which to review voicemails lists and download or stream content, cellular phone systems and wireless data networks typically have slow data links making it impractical to access entire voicemail messages due to lengthy download times. It would be useful to be able to navigate and/or manage access to voicemails remotely, as emails are now managed, without requiring a lot of time waiting for responses due to slow connection speeds.

BRIEF DESCRIPTION OF THE DRAWINGS

Various embodiments of the invention are disclosed in the following detailed description and the accompanying drawings.

DETAILED DESCRIPTION

Figure 1:
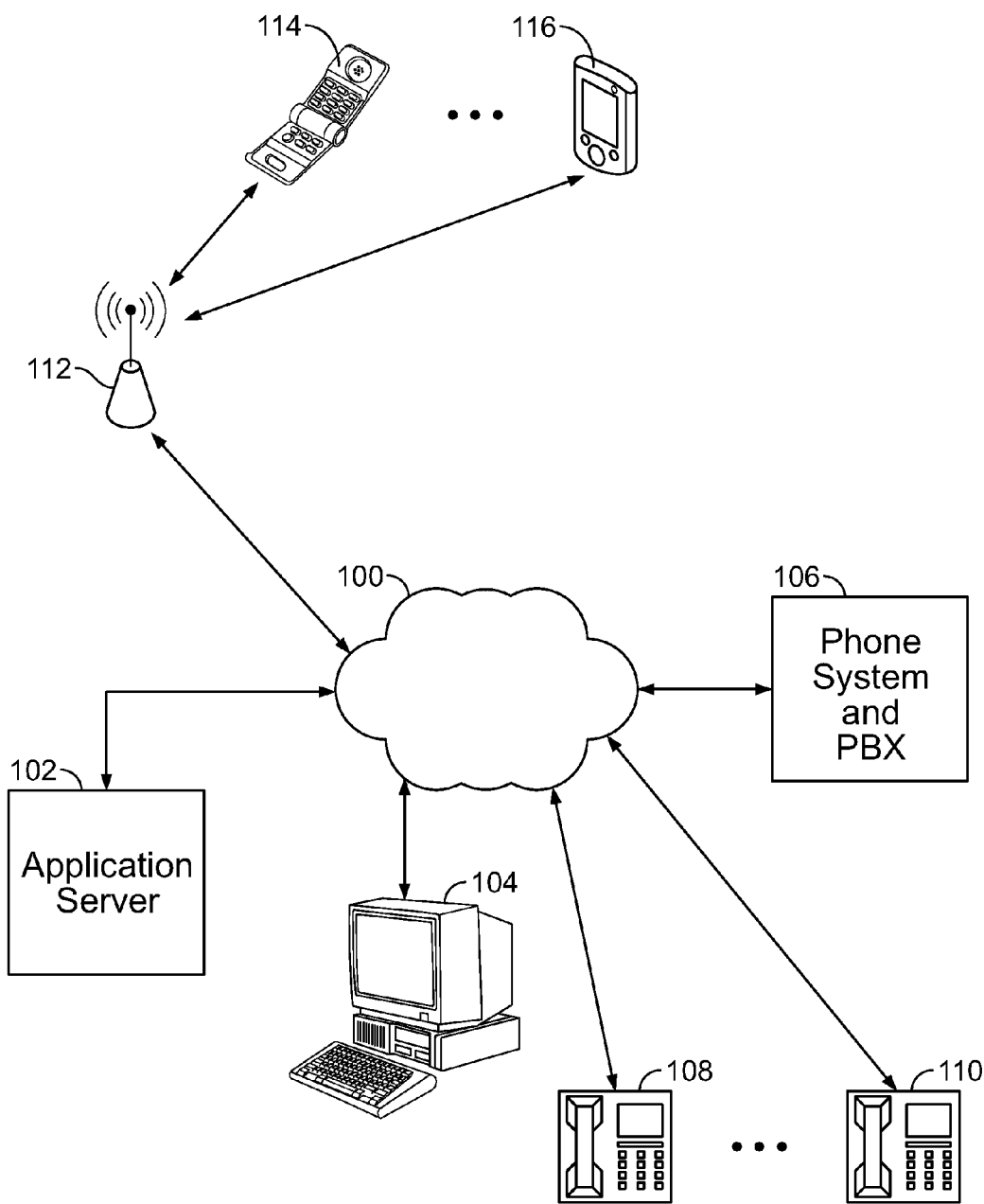
FIG. 1 is a block diagram illustrating an embodiment of a system for previewing voicemail.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Previewing voice over internet protocol voicemail is disclosed. A request is sent for information of voicemail available to preview using a data channel associated with a cellular phone system. Information of voicemail available to preview and one preview portion for each voicemail available to preview are received. Information of voicemail available to preview is displayed. A selection of one of the available voicemails to preview is received. A preview portion corresponding to the selected voicemail is played.

In some embodiments, information of voicemail available to preview comprises information identifying the requestor's voicemail available to preview.

In some embodiments, a voice over internet protocol (VoIP) phone system includes a voicemail system capable of recording voicemails. The VoIP phone system voicemail can be accessed using a mobile device. The mobile device accesses the VoIP phone system via a data channel associated with a cellular phone system that typically has a limited bandwidth (e.g., 2.5G cellular networks typically have approximately 10-20 kbps in uplink and 10-40 kbps in downlink) and a substantial latency (e.g., round trips on a cellular network can be on the order of seconds). In order to more efficiently manage voicemails, the mobile device can show a list of all voicemails and a small preview can be listened to instead of listening to an entire voicemail. The mobile device shows a list of voicemails available for previewing. The list can include the incoming call's caller ID, time of the call, and length of the message. A user can select one or more voicemails for previewing. A preview is played that is a preview portion or short chunk of the voicemail in order to be practical when using the limited bandwidth data channel (e.g., 5 seconds, or a tenth of the entire message, or 20 seconds compressed to 5 seconds) and so that the data sent out and received back can be achieved in one packet sent out and one packet sent back to avoid the latency in the system. The preview portion is a compressed voice file such as an MP3 file or other audio compression to make the transmission of the voice file efficient. The preview portion can be compressed in time (e.g., the first 10 seconds sped up to be played in 6 seconds) to make hearing the preview portion more efficient, and, sometimes, is processed to keep the pitch of the voice the same when the preview portion has been compressed in time. In some cases, the preview portion is processed to remove dead spaces or to identify if a number is spoken during the preview portion.

FIG. 1 is a block diagram illustrating an embodiment of a system for previewing voicemail. In the example shown, phone system and PBX (private branch exchange) 106 can communicate with network 100. Network 100 comprises one or more networks capable of transferring data—for example, a local area network, a wide area network, a wired network, a wireless network, or the Internet. A plurality of VoIP phones, represented in FIG. 1 by 108 and 110, can also communicate with network 100. The capabilities of the VoIP phones and phone system and PBX 106 enable users of the VoIP phones to make and receive phone calls. Computer 104 is able to communicate with network 100 and is capable of performing some functions (e.g., viewing voicemail, call activity, dialing phone, changing personal settings, etc.) regarding the VoIP phones and phone system and PBX 106 using personal call manager software. Application server 102 is connected to network 100 and enables voicemail functionality for a VoIP phone system. Application server 102 also enables previewing of voicemail by mobile devices, represented in FIG. 1 by cell phone 114 and personal data assistant/smart phone 116. Mobile devices can communicate with network 100 via a data channel of a cellular phone system (e.g., using a 2.5G data link associated with a voice cellular system), where access point 112 is acting as a part of a cellular phone system. Access point 112 enables the mobile devices to communicate with application server 102.

In various embodiments, phone system and PBX 106 and application server 102 capabilities are supported by one physical box of hardware, each by one or more pieces of physical hardware, or any other configuration that can support appropriate voicemail functionality.

Figure 2:
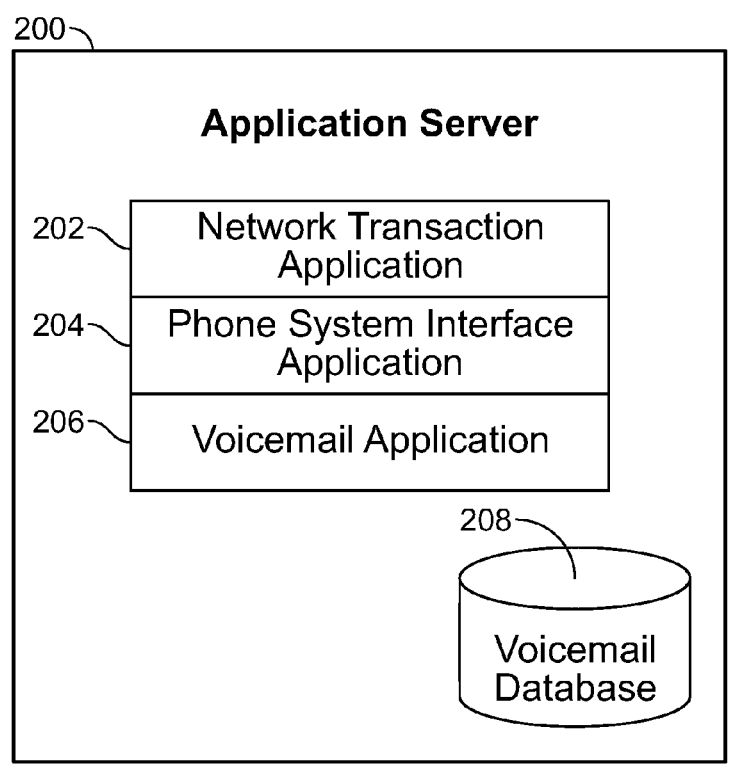
FIG. 2 is a block diagram illustrating an embodiment of software for an application server.

FIG. 2 is a block diagram illustrating an embodiment of software for an application server. In some embodiments, application server 200 of FIG. 2 is used to implement application server 102. In the example shown, application server 200 includes network transaction application 202, phone system interface application 204, voicemail application 206, and voicemail database 208. Application server 200 receives requests and provides responses to the received requests from mobile devices regarding previewing of voicemail. Mobile devices communicate with application server 200 via a data channel associated with a cellular phone system and the Internet. Network transaction application 202 handles the interface for application server 200 for communications with the mobile devices via the Internet. Voicemail application 206 provides voicemail capability for a phone system including managing voicemail database 208. Voicemail application 206 and voicemail database 208 provide the capabilities of storing, previewing, retrieving, saving, deleting, etc. voicemails associated with a phone number. Voicemail application 206 services requests from mobile devices and also from phones and computers attached to a network (e.g., VoIP personal call managers running on a user's computer or a VoIP phone hooked to a local area network). Requests from phones and computers attached to a local network are handled by phone system interface application 204.

Figure 3:
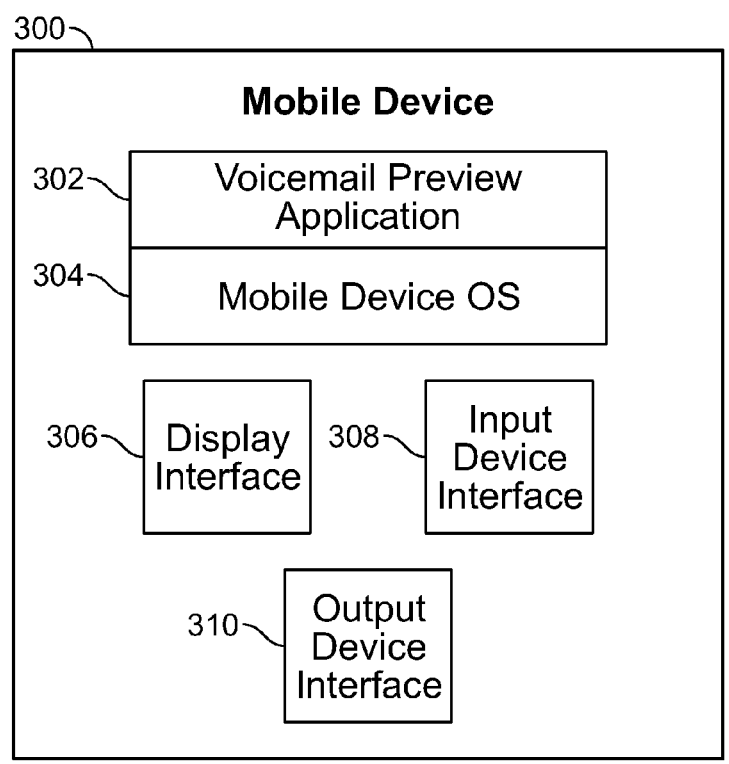
FIG. 3 is a block diagram illustrating an embodiment of software for a mobile device.

FIG. 3 is a block diagram illustrating an embodiment of software for a mobile device. In some embodiments, mobile device 300 of FIG. 3 is used to implement mobile device 114 or 116 of FIG. 1. In the example shown, mobile device 300 includes voicemail preview application 302, mobile device OS (operating system) 304, display interface 306, input device interface 308, and output device interface 310. Mobile device 300 can access voicemail by connecting through the voice carrier system. Voice carrier systems access the standard functionality of a voicemail system. Mobile device 300 can also access voicemail by connecting through a data channel associated with a cellular phone system with limited bandwidth (e.g., 2.5G cellular phone system) and the Internet, which enable previewing for the voicemail system. Voicemail previewing application 302 provides functionality to display voicemail available for previewing and to select and request a voicemail for previewing. Display interface 306 handles the interface to a display that can list voicemails available for preview including relevant information regarding the voicemail such as caller ID for the incoming message, length of message, and date and time of the message. Input device interface 308 handles the interface to a keypad, wheel, five-way toggle switch, stylus, or any other appropriate input device for the mobile device. The input device can be used by a user to select the previewing menu, select a particular voicemail to preview, and issue other relevant commands related to previewing. Output device interface 310 handles the interface to a speaker or head phone jack driver, which enables playing a preview of a voicemail for a user.

In some embodiments, after previewing a voicemail, the user elects to listen to the entire voicemail message, where the previewing software initiates a normal voicemail connection via the voice carrier system which allows the playing of the entire voicemail.

In various embodiments, the preview voicemail is a compressed audio file in a compressed audio format such as a .mp3, .amr, .qcp, .vnf, or .mmf file format, where output device interface 310 or a separate decoder application handles the conversion of the compressed audio file format to a playable audio format for the mobile device speaker or a headphone.

Figure 4:
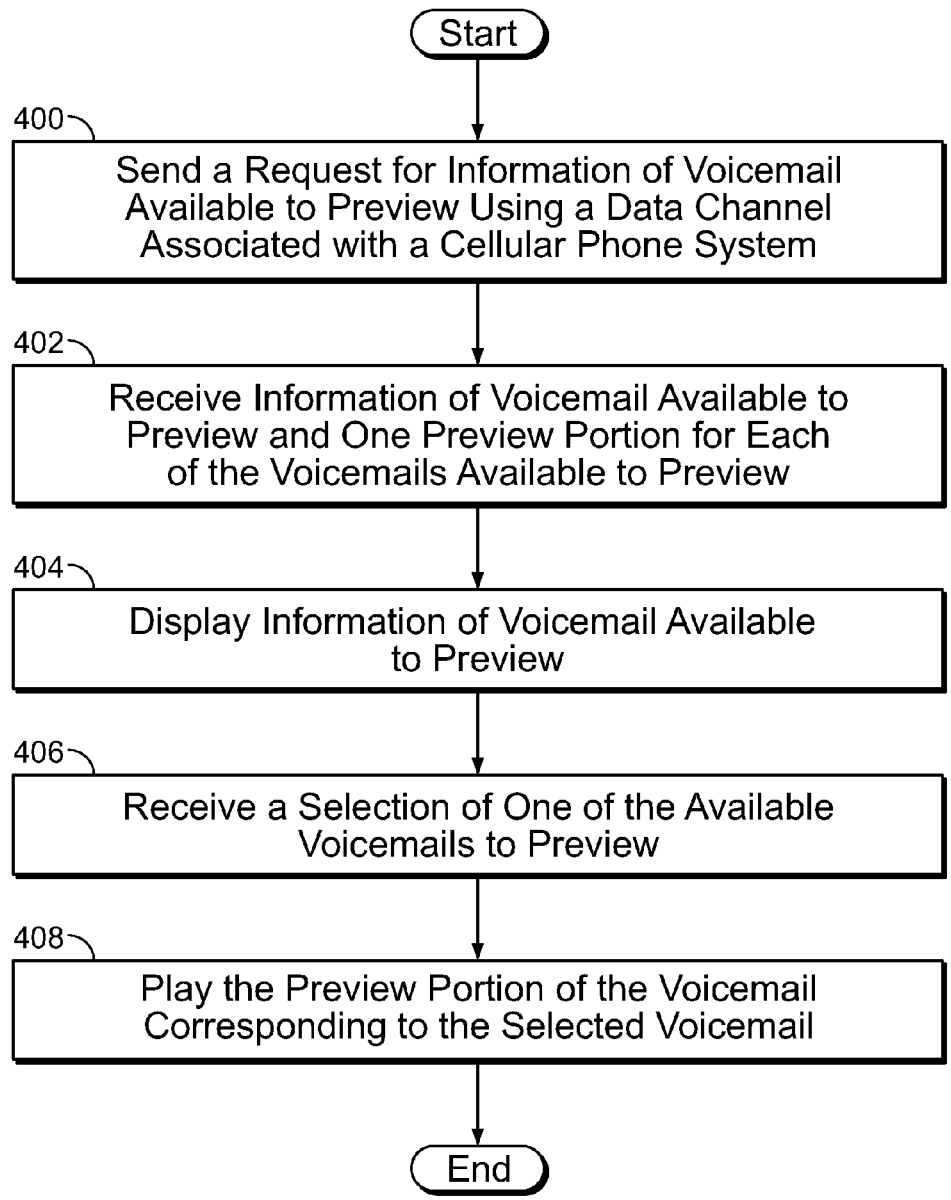
FIG. 4 is a flow diagram illustrating an embodiment of a process for previewing voicemail.

FIG. 4 is a flow diagram illustrating an embodiment of a process for previewing voicemail. In some embodiments, the process of FIG. 4 is executed in voicemail preview application 302 of FIG. 3. In the example shown, in 400 a request is sent for information of voicemail available to preview using a data channel associated with a cellular phone system (e.g., the limited bandwidth data channel of a 2.5G network). For example, a menu item is selected indicating a desire to preview voicemail on a mobile device. In 402, information is received of voicemail available to preview and one preview portion for each of the voicemails available to preview. For example, the phone number or caller ID of the incoming call that left the message, the time and date of the message, and the length of the message. In 404, the information of the voicemail available to preview is displayed. For example, the mobile device display shows a list of available voicemails for preview that is ordered from most recent to least recent. In 406, a selection is received of one or more of the available voicemails to preview. In some cases, a mobile device user selects one or more voicemail using a keypad, a scroll button, a voice command, a stylus, or any combination thereof or any other appropriate manner of selecting for a mobile device. In 408, the requested preview portion of the voicemail corresponding to the selected voicemail is played. In some embodiments, the preview selection is in a compressed audio format like an MP3 audio file and requires the mobile device to decode the audio format during playing of the preview selection.

In some embodiments, if the caller ID number is associated with a name and number in the mobile device contact list then the name is substituted for caller number in the list. In some embodiments, the mobile device user can select a format for the preview call list—for example, the format of the time and date associated with the incoming message or either including or excluding the length of the message. In some embodiments, the user can select a preference to listen to a portion of different length or different position within the voicemail from a default of the first 5 seconds of the voicemail—for example, 10 seconds beginning from the $4^{th}$ second of the voicemail.

Figure 5:
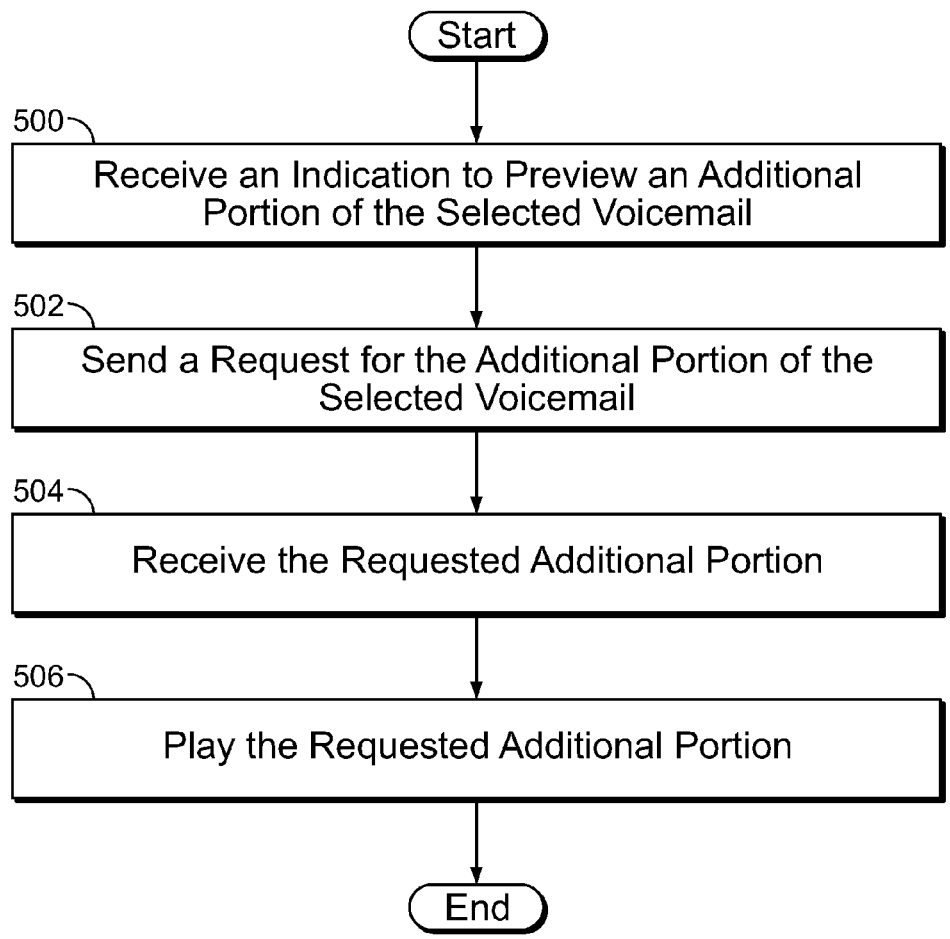
FIG. 5 is a flow diagram illustrating an embodiment of a process for previewing voicemail.

FIG. 5 is a flow diagram illustrating an embodiment of a process for previewing voicemail. In some embodiments, the process of FIG. 5 is executed in voicemail preview application 302 of FIG. 3 and follows the execution of the process of FIG. 4. In the example shown, in 500 an indication to preview more of the selection is received. A user desires to hear another chunk or preview portion of a voicemail different from the first preview portion that was played when a preview of the voicemail was previously selected. In various embodiments, the user selects a next preview portion, a last preview portion, a longer preview portion, a sampled set of preview portions, a forwarding message preview portion and a preview portion of the forwarded message, or any other appropriate part of the voicemail for continued previewing. In 502, a request for the additional preview portion of the selected voicemail is sent. In 504, the requested additional portion is received. In 506, the requested additional portion is played.

Figure 6:
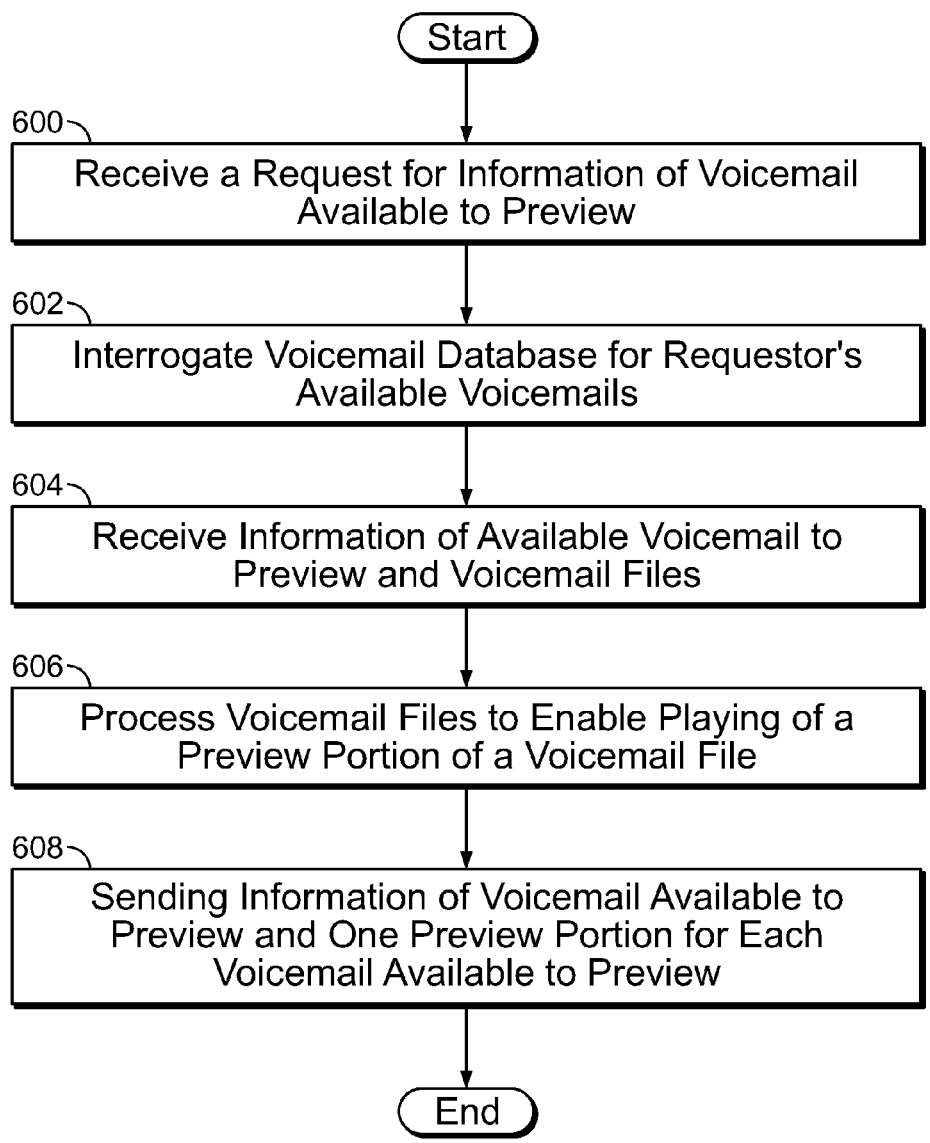
FIG. 6 is a flow diagram illustrating an embodiment of a process for previewing voicemail.

FIG. 6 is a flow diagram illustrating an embodiment of a process for previewing voicemail. In some embodiments, the process of FIG. 6 is executed in voicemail application 206 of FIG. 2. In the example shown, in 600 a request is received for information of voicemail available to preview. In 602, a voicemail server or database is interrogated for the requestor's available voicemails. In 604, information of the available voicemail to preview and voicemail files are received. The interrogation or query returns how many voicemails there are for the requesting user, information regarding the voicemails available to preview (e.g., length of voicemail, time and date of voicemail, caller ID associated with voicemail, forwarding number, forwarding message length, etc.), and the corresponding voicemail files (e.g., the audio file for the voicemail, forwarded message, etc.). In 606, voicemail files are processed to enable the playing of a preview portion of a voicemail file for each available voicemail. The first section of each voicemail file is time compressed (e.g., essentially speed the playing so that, for example, 8 seconds plays in 5 seconds), pitch corrected (e.g., to remove distortion from time compression), with blank spaces removed to create a compressed audio file (e.g., an MP3 file) that is small to make efficient use of bandwidth, phone memory, and phone processing—for example, each preview portion file is between 5 and 10 kilobytes which allows quick transmission and storage on the phone. In 608, information of voicemail available to preview and one preview portion for each voicemail available to preview are sent.

In various embodiments, available preview voicemail portions are downloaded to the phone on request of a user or are downloaded as a background process. In various embodiments, the information regarding available voicemail portions are downloaded on request of a user or are downloaded as a background process.

Figure 7:
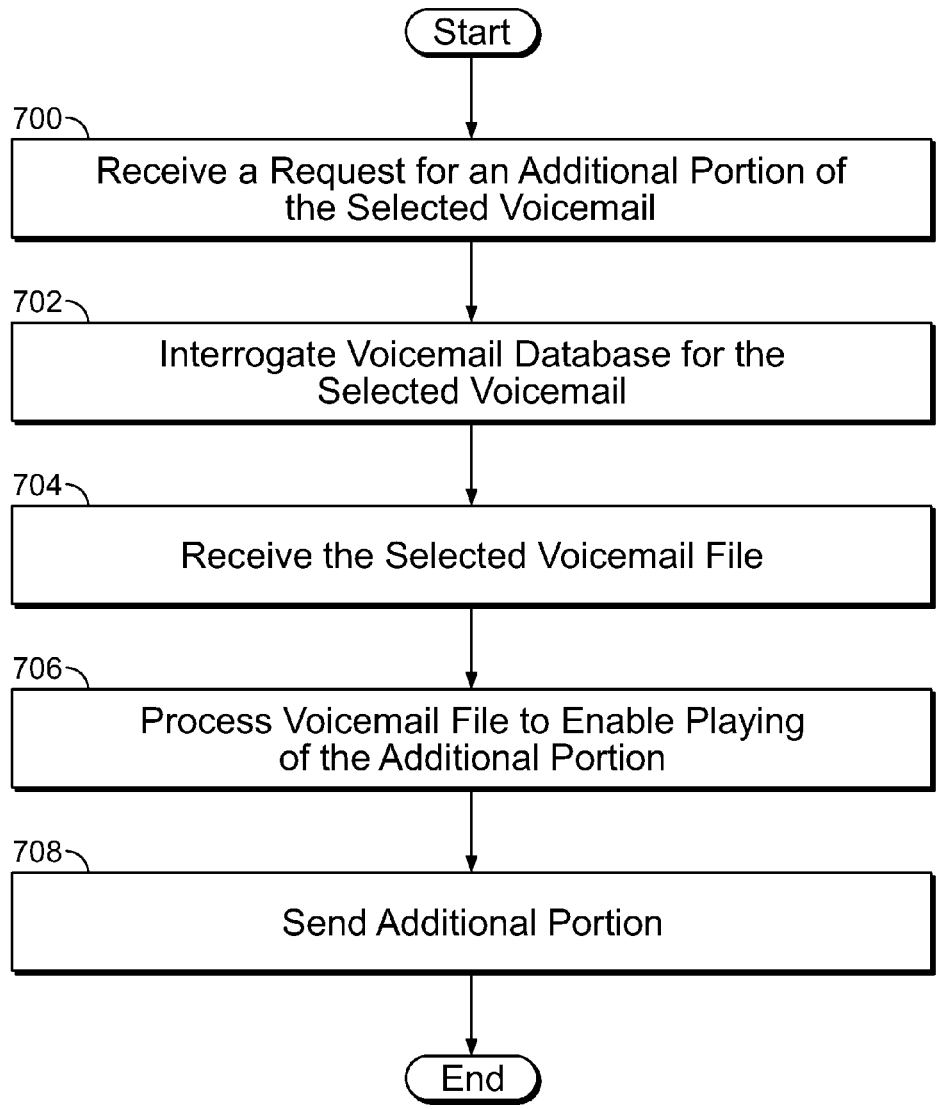
FIG. 7 is a flow diagram illustrating an embodiment of a process for sending information of available voicemail to preview.

FIG. 7 is a flow diagram illustrating an embodiment of a process for sending information of available voicemail to preview. In some embodiments, the process of FIG. 7 is executed in voicemail application 206 of FIG. 2. In 700, a request is received for an additional portion of the selected voicemail. For example, a user desires a next portion, a portion with a phone number embedded in it, a last portion of the voicemail. In 702, the voicemail database is interrogated for the selected voicemail. In 704, the selected voicemail file is received. In some cases, the selected voicemail is still cached from generating the first preview portion for the requestor in which case steps 702 and 704 are not required. In 706, the voicemail is process to enable playing of the additional portion. In various embodiments, the requested portion is extracted from the voicemail file, the voicemail portion is time compressed, the voicemail has blank space removed (e.g., when no voice or sound is present in the voicemail), the voicemail is pitch corrected after having been time compressed, the voicemail is processed by number recognition software to locate a spoken number, the voicemail file is compressed (e.g., MP3, converted to a compressed audio file format), or any other appropriate voicemail file processing. In 708, the additional portion is sent.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of previewing VoIP voicemail comprising:
sending a request for VoIP voicemail available to preview using a data channel associated with a cellular phone system;
receiving information of the VoIP voicemail available to preview and one preview portion for each of the VoIP voicemail available to preview, wherein each of the one preview portion for each of the VoIP voicemail available to preview is less than all of the VoIP voicemail available to preview and comprises a sampling of one or more chunks of each of the VoIP voicemail available to preview, and wherein the chunks of each of the VoIP voicemail available to preview are time compressed to speed up playback so that each of the one preview portion for each of the VoIP voicemail available to preview includes a longer portion of the VoIP voicemail available to preview;
displaying the information of VoIP voicemail available to preview;
receiving a selection of a voicemail, wherein the voicemail comprises one of the VoIP voicemail available to preview; and
playing, using a processor, a preview portion of the voicemail corresponding to the selection of one of the VoIP voicemail available to preview;
receiving a user selection of an additional preview portion of a selected VoIP voicemail that a preview portion has already been received and played;
sending a request for the additional preview portion of the selected VoIP voicemail;
receiving the requested additional preview portion, wherein the requested additional preview portion comprises another chunk of the VoIP voicemail not already processed and previewed, wherein the additional preview portion is extracted from the selected VoIP voicemail after the request so that the additional preview portion is less than all of the selected VoIP voicemail, wherein the requested preview portion is also time compressed to speed up playback so the additional preview portion of the selected VoIP voicemail includes a longer portion of the selected VoIP;
playing the additional preview portion of the selected VoIP voicemail.

2. A computer program product for previewing VoIP voicemail, the computer program product being embodied in a non-transitory computer readable medium and comprising computer instructions for:
sending a request for VoIP voicemail available to preview using a data channel associated with a cellular phone system;
receiving information of the VoIP voicemail available to preview and one preview portion for each of the VoIP voicemail available to preview, wherein each of the one preview portion for each of the VoIP voicemail available to preview is less than all of the VoIP voicemail available to preview and comprises a sampling of one or more chunks of each of the VoIP voicemail available to preview, and wherein the chunks of each of the VoIP voicemail available to preview are time compressed to speed up playback so that each of the one preview portion for each of the VoIP voicemail available to preview includes a longer portion of the VoIP voicemail available to preview;

displaying the information of VoIP voicemail available to preview;

receiving a selection of a voicemail, wherein the voicemail comprises one of the VoIP voicemail available to preview; and playing a preview portion of the voicemail corresponding to the selection of one of the VoIP voicemail available to preview;

receiving a user selection of an additional preview portion of a selected VoIP voicemail that a preview portion has already been received and played;

sending a request for the additional preview portion of the selected VoIP voicemail;

receiving the requested additional preview portion, wherein the requested additional preview portion comprises another chunk of the VoIP voicemail not already processed and previewed, wherein the additional preview portion is extracted from the selected VoIP voicemail after the request so that the additional preview portion is less than all of the selected VoIP voicemail, wherein the requested preview portion is also time compressed to speed up playback so the additional preview portion of the selected VoIP voicemail includes a longer portion of the selected VoIP;

playing the additional preview portion of the selected VoIP voicemail.

3. A system for previewing VoIP voicemail comprising:
a processor; and
a memory coupled with the processor, wherein the memory is configured to provide the processor with instructions which when executed cause the processor to:
send a request for VoIP voicemail available to preview using a data channel associated with a cellular phone system;
receive information of the VoIP voicemail available to preview and one preview portion for each of the VoIP voicemail available to preview, wherein each of the one preview portion for each of the VoIP voicemail available to preview is less than all of the VoIP voicemail available to preview and comprises a sampling of one or more chunks of each of the VoIP voicemail available to preview, and wherein the chunks of each of the VoIP voicemail available to preview are time compressed to speed up playback so that each of the one preview portion for each of the VoIP voicemail available to preview includes a longer portion of the VoIP voicemail available to preview;
display the information of VoIP voicemail available to preview;
receive a selection of a voicemail, wherein the voicemail comprises one of the VoIP voicemail available to preview; and
play a preview portion of the voicemail corresponding to the selection of one of the VoIP voicemail available to preview;
receiving a user selection of an additional preview portion of a selected VoIP voicemail that a preview portion has already been received and played;

sending a request for the additional preview portion of the selected VoIP voicemail;

receiving the requested additional preview portion, wherein the requested additional preview portion comprises another chunk of the VoIP voicemail not already processed and previewed, wherein the additional preview portion is extracted from the selected VoIP voicemail after the request so that the additional preview portion is less than all of the selected VoIP voicemail, wherein the requested preview portion is also time compressed to speed up playback so the additional preview portion of the selected VoIP voicemail includes a longer portion of the selected VoIP;

playing the additional preview portion of the selected VoIP voicemail.

4. A system as in claim 3, wherein the information of the VoIP voicemail available to preview includes a caller ID.

5. A system as in claim 3, wherein the information of the VoIP voicemail available to preview includes a date.

6. A system as in claim 3, wherein the information of the VoIP voicemail available to preview includes a time.

7. A system as in claim 3, wherein the information of the VoIP voicemail available to preview includes a message length.

8. A system as in claim 3, wherein the information of the VoIP voicemail available to preview includes a forwarder ID.

9. A system as in claim 3, wherein the information of the VoIP voicemail available to preview includes a forwarder message length.

10. A system as in claim 3, wherein the selection of one of the available VoIP voicemails comprises selecting using a stylus.

11. A system as in claim 3, wherein the selection of one of the available VoIP voicemails comprises selecting using a keypad.

12. A system as in claim 3, wherein the selection of one of the available VoIP voicemails comprises selecting using a scroll button.

13. A system as in claim 3, wherein the selection of one of the available VoIP voicemails comprises selecting using a voice command.

14. A system as in claim 3, wherein playing the requested selection comprises processing to play a compressed audio format file.

15. A system as in claim 3, wherein the preview portion of the VoIP voicemail comprises one or more of the following: the first 5 seconds the entire VoIP voicemail, 10 seconds beginning from the $4^{th}$ second of the VoIP voicemail, a middle portion, or a portion with a phone number embedded in it.

16. A system as in claim 3, wherein the preview portion comprises a pitch corrected time compressed portion of the VoIP voicemail.

17. A system as in claim 3, wherein the preview portion comprises a portion of the VoIP voicemail with blank spaces removed.

18. A system as in claim 3, wherein the preview portion comprises a portion of a forwarding message.

19. A system as in claim 3, wherein the user selection for the additional preview portion comprises a user selection a longer preview portion of the VoIP voicemail.

20. A system as in claim 3, wherein the user selection for the additional preview portion comprises a user selection of a last preview portion of the VoIP voicemail.

21. A system as in claim 3, wherein the user selection for the additional preview portion comprises a user selection of a preview portion with a phone number embedded in the VoIP voicemail.

22. A system as in claim 3, wherein the user selection for the additional preview portion comprises a user selection of a next preview portion of the VoIP voicemail.

23. A method of previewing VoIP voicemail comprising:
receiving a request for information of VoIP voicemail available to preview;
interrogating a voicemail database for the requestor for information of VoIP voicemail available to preview;
receiving information of VoIP voicemail available to preview including voicemail files;
processing, using a processor, the voicemail files to enable playing of a preview portion of a file of the voicemail files, wherein the preview portion of the file of the voicemail files is less than all of the file of the voicemail files and comprises a sampling of one or more chunks of the file of the voicemail files, and wherein the chunks of the file of the voicemail files are time compressed to speed up playback so the preview portion of the file of the voicemail files includes a longer portion of the file of the voicemail files; and
sending information of VoIP voicemail available to preview and one preview portion for each of the voicemail files;
receiving a request for an additional preview portion of a selected VoIP voicemail out of the information of VoIP voicemail available to preview;
interrogating the voicemail database for the selected VoIP voicemail;
receiving a VoIP voicemail file corresponding to the selected VoIP voicemail;
processing the VoIP voicemail file to enable playing the additional preview portion of the selected VoIP voicemail, wherein the additional preview portion comprises another chunk of the selected VoIP voicemail not already processed, wherein the additional preview portion is extracted from the selected VoIP voicemail file after the request so that the additional preview portion is less than all of the VoIP voicemail file, wherein the additional preview portion is also time compressed to speed up playback so the additional preview portion of the selected VoIP voicemail includes a longer portion of the selected VoIP voicemail;
sending the additional preview portion of the selected VoIP voicemail.

24. A computer program product for previewing VoIP voicemail, the computer program product being embodied in a non-transitory computer readable medium and comprising computer instructions for:
receiving a request for information of VoIP voicemail available to preview;
interrogating a voicemail database for the requestor for information of VoIP voicemail available to preview;
receiving information of VoIP voicemail available to preview including voicemail files;
processing the voicemail files to enable playing of a preview portion of a file of the voicemail files, wherein the preview portion of the file of the voicemail files is less than all of the file of the voicemail files and comprises a sampling of one or more chunks of the file of the voicemail files, and wherein the chunks of the file of the voicemail files are time compressed to speed up playback so the preview portion of the file of the voicemail files includes a longer portion of the file of the voicemail files; and
sending information of VoIP voicemail available to preview and one preview portion for each of the voicemail files;
receiving a request for an additional preview portion of a selected VoIP voicemail out of the information of VoIP voicemail available to preview;
interrogating the voicemail database for the selected VoIP voicemail;
receiving a VoIP voicemail file corresponding to the selected VoIP voicemail;
processing the VoIP voicemail file to enable playing the additional preview portion of the selected VoIP voicemail, wherein the additional preview portion comprises another chunk of the selected VoIP voicemail not already processed, wherein the additional preview portion is extracted from the selected VoIP voicemail file after the request so that the additional preview portion is less than all of the VoIP voicemail file, wherein the additional preview portion is also time compressed to speed up playback so the additional preview portion of the selected VoIP voicemail includes a longer portion of the selected VoIP voicemail;
sending the additional preview portion of the selected VoIP voicemail.

25. A system for previewing VoIP voicemail comprising:
a processor; and
a memory coupled with the processor, wherein the memory is configured to provide the processor with instructions which when executed cause the processor to:
receive a request for information of VoIP voicemail available to preview;
interrogate a voicemail database for the requestor for information of VoIP voicemail available to preview;
receive information of VoIP voicemail available to preview including voicemail files;
process the voicemail files to enable playing of a preview portion of a file of the voicemail files, wherein the preview portion of the file of the voicemail files is less than all of the file of the voicemail files and comprises a sampling of one or more chunks of the file of the voicemail files, and wherein the chunks of the file of the voicemail files are time compressed to speed up playback so the preview portion of the file of the voicemail files includes a longer portion of the file of the voicemail files; and
send information of VoIP voicemail available to preview and one preview portion for each of the voicemail files;
receiving a request for an additional preview portion of a selected VoIP voicemail out of the information of VoIP voicemail available to preview;
interrogating the voicemail database for the selected VoIP voicemail;
receiving a VoIP voicemail file corresponding to the selected VoIP voicemail;
processing the VoIP voicemail file to enable playing the additional preview portion of the selected VoIP voicemail, wherein the additional preview portion comprises another chunk of the selected VoIP voicemail not already processed, wherein the additional preview portion is extracted from the selected VoIP voicemail file after the request so that the additional preview portion is less than all of the VoIP voicemail file, wherein the additional preview portion is also time compressed to speed up playback so the additional preview portion of the selected VoIP voicemail includes a longer portion of the selected VoIP voicemail;
sending the additional preview portion of the selected VoIP voicemail.

* * * * *